S. D. FISHER.
Land Marker.
No. 106,042. Patented Aug. 2, 1870.
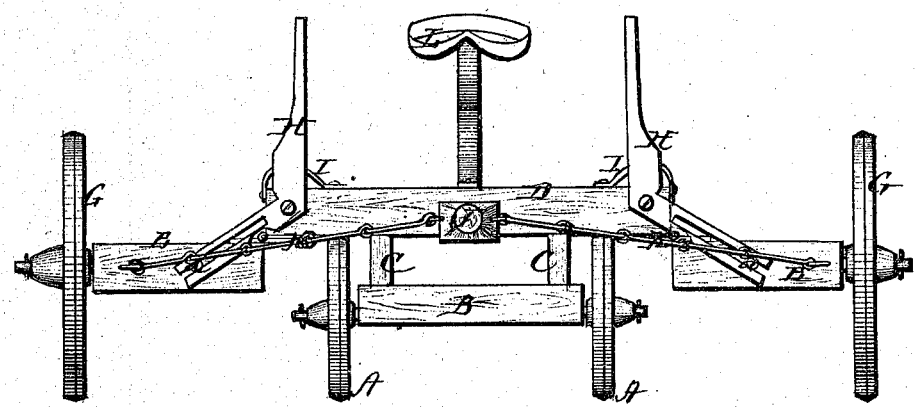
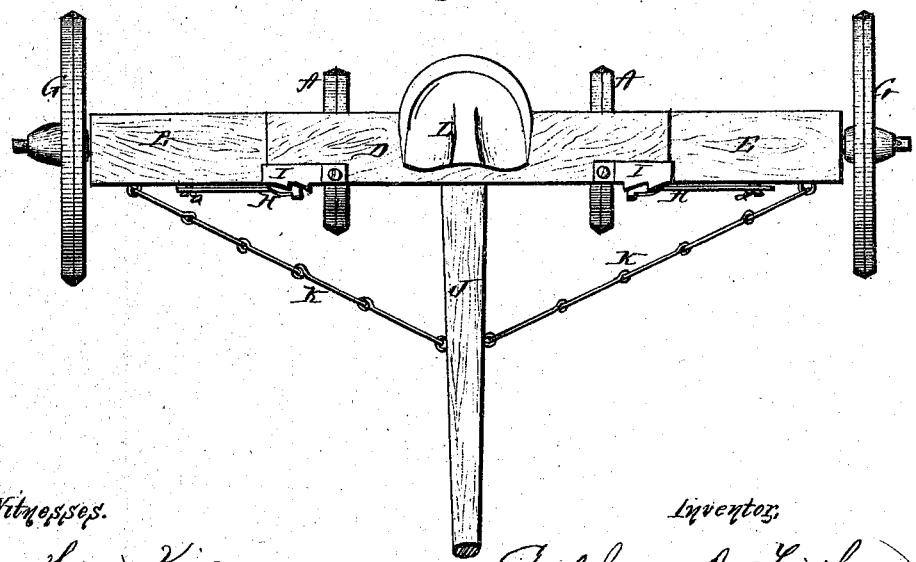

United States Patent Office.

STEPHEN D. FISHER, OF NORMAL, ILLINOIS.

Letters Patent No. 106,042, dated August 2, 1870.

IMPROVEMENT IN SEED-MARKER.

The Schedule referred to in these Letters Patent and making part of the same.

*To all whom it may concern:*

Be it known that I, STEPHEN D. FISHER, of Normal, in the county of McLean and in the State of Illinois, have invented certain new and useful Improvements in Seed-Markers; and do hereby declare that the following is a full, clear, and exact description thereof, reference being had to accompanying drawing and to the letters of reference marked thereon making a part of this specification.

The nature of my invention consists in the construction and arrangement of a device for marking land preparatory to sowing seed or grain.

In order to enable others skilled in the art to which my invention appertains to make and use the same, I will now proceed to describe its construction and operation, referring to the annexed drawing, in which—

Figure 1 is a front view, and
Figure 2 a plan view of my machine.

A A represent the two center wheels, mounted one upon each end of the axle-tree B, from which rise two standards, C C, of suitable height, to support a horizontal beam, D, directly over the wheels A A.

This beam D extends a short distance beyond said wheels, which have, at the lower edge of their ends, other beams, E E, hinged to the same, said beams or axles being of such length that the distance between the wheel A and a wheel, G, mounted upon the outer end of the axle E, will be the same as the distance between the wheels A A.

The wheels G G are of so much larger diameter than the wheels A A, that the beams or axles E E will be horizontal when the machine moves on level ground.

At each end, on the front side of the beam D, is pivoted a bent lever, H, one end of which is forked, and embraces a pin or bolt, a, on the axle E, for the purpose of raising said axle and wheel when desired.

The lever H is held by a toothed segment, I, secured to the beam D.

The tongue J is secured to the center of the beam D, and connected by chains K K with the axles E E.

It will be seen that the outside wheels G G will readily accommodate themselves to uneven ground, and either one or both can be raised by the driver, from his seat at L, by the use of the levers H H, to avoid stumps, &c., passing through gates or bars, or whenever desired or necessary.

The rims of the wheels A and G are beveled on their outer circumference, as shown in the drawing.

Having thus fully described my invention,
What I claim as new, and desire to secure by Letters Patent, is—

The combination of the wheels A A, axle B, beam D, axles E E, wheels G G, levers H H, segments I I, tongue J, and chains K K, all constructed and arranged to operate substantially as and for the purposes herein set forth.

In testimony that I claim the foregoing, I have hereunto set my hand this 3d day of February, 1870.

STEPHEN D. FISHER.

Witnesses:
 THOS. SLADE,
 N. T. PUSEY.